(12) United States Patent
Nakano

(10) Patent No.: US 10,091,742 B2
(45) Date of Patent: Oct. 2, 2018

(54) WIRELESS COMMUNICATION DEVICE

(71) Applicant: MITSUBISHI ELECTRIC CORPORATION, Tokyo (JP)

(72) Inventor: Hisao Nakano, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 26 days.

(21) Appl. No.: 15/524,590

(22) PCT Filed: Jan. 8, 2015

(86) PCT No.: PCT/JP2015/050374
§ 371 (c)(1),
(2) Date: May 4, 2017

(87) PCT Pub. No.: WO2016/110979
PCT Pub. Date: Jul. 14, 2016

(65) Prior Publication Data
US 2018/0249425 A1 Aug. 30, 2018

(51) Int. Cl.
*H04W 52/24* (2009.01)
*H04W 4/80* (2018.01)

(52) U.S. Cl.
CPC ............ *H04W 52/245* (2013.01); *H04W 4/80* (2018.02)

(58) Field of Classification Search
CPC combination set(s) only.
See application file for complete search history.

(56) References Cited

U.S. PATENT DOCUMENTS 8,977,189 B2 * 3/2015 Lee .................... H04B 7/15535
370/310
2004/0127216 A1 7/2004 Fukushima
(Continued)

FOREIGN PATENT DOCUMENTS

JP 2004-208008 A 7/2004
JP 2007-259055 A 10/2007
(Continued)

OTHER PUBLICATIONS

Bluetooth Specification Version 2.1 + EDR [vol. 0 to vol. 4], Jul. 26, 2007.

*Primary Examiner* — Fayyaz Alam
(74) *Attorney, Agent, or Firm* — Birch, Stewart, Kolasch & Birch, LLP (57) ABSTRACT

The wireless communication device includes: a wireless communication unit issuing a request to increase or decrease transmission power to another device in such a way that a received signal strength of a radio wave transmitted from another device falls within a predetermined range, and performing a transmission power control of a wireless communication device in response to a request to increase or decrease transmission power from another device. Further, the wireless communication device includes: a control unit performing a control of decreasing the received signal strength of each of the wireless communication device and another device, when a communication state satisfies a condition for increasing the transmission power, to cause the wireless communication unit of the wireless communication device to issue the request to increase the transmission power to another device, and also cause another device to issue the request to increase the transmission power to the wireless communication device.

10 Claims, 5 Drawing Sheets

(56) References Cited

U.S. PATENT DOCUMENTS

| | | | |
|---|---|---|---|
| 2005/0030820 A1* | 2/2005 | Choi | G11C 7/1051 365/232 |
| 2009/0311961 A1 | 12/2009 | Banerjea | |
| 2010/0002654 A1* | 1/2010 | Lindoff | H04W 52/40 370/332 |
| 2010/0069014 A1 | 3/2010 | Haartsen et al. | |
| 2012/0142274 A1 | 6/2012 | Bard et al. | |
| 2015/0208364 A1 | 7/2015 | Fukuhara et al. | |
| 2017/0257184 A1* | 9/2017 | Stirling-Gallacher | H04L 5/006 |

FOREIGN PATENT DOCUMENTS

| | | |
|---|---|---|
| JP | 2012-503353 A | 2/2012 |
| JP | 2012-244317 A | 12/2012 |
| WO | WO 2014/054170 A1 | 4/2014 |

* cited by examiner

WIRELESS COMMUNICATION DEVICE

TECHNICAL FIELD

The present invention relates to a wireless communication device that controls transmission power at a time of wireless communications.

BACKGROUND ART

Among in-vehicle apparatuses such as a car navigation device, there is an apparatus in which a wireless communication function based on the Bluetooth (a registered trademark: this description will be omitted hereafter) system is mounted. Such a wireless communication function is used for communication with an information terminal, such as a mobile phone or an audio player to realize a hands free call, a dialup connection, playback of music, or the like.

In wireless communications based on the Bluetooth system, the 2.4 GHz band which is called the ISM (Industry Science Medical) band being assigned to industrial use, scientific use and medical use is used. The same 2.4 GHz frequency band is used for wireless communications based on the wireless LAN (Local Area Network) system being compliant with IEEE802.11b/g/n or the like, and cordless telephones, as well as for wireless communication based on the Bluetooth system.

In recent years, a wireless communication function based on the wireless LAN system is mounted on laptop PCs (Personal Computers), smart phones, tablet terminals, etc., and is widely used at home, offices, public wireless LANs, etc. Recently, the number of vehicles mounting such a wireless communication function has been increasing. Then, in a wireless communication function based on the Bluetooth system which is mounted on an in-vehicle apparatus, there arises a problem that communication quality degrades due to the radio wave interference from an ISM band apparatus such as an apparatus using the wireless LAN system. In addition, in the case of an in-vehicle apparatus, there is also a problem that a change of an interference wave channel and a variation in an interference wave level occur in accordance with the moving of the user's vehicle or an adjacent vehicle.

<Specifications of Transmission Power Control Based on Bluetooth System>

Hereafter, the specifications of transmission power control (Power Control) based on the Bluetooth system, which are disclosed in Non patent Literature 1, will be explained.

In the Bluetooth system, the wireless communication device at this end outputs a request to the other wireless communication device being a communication partner based on the received signal strength (RSSI: Received Signal Strength Indication) of a radio wave received by the wireless communication device at this end to control the transmission power of the other wireless communication device so that the RSSI falls within a predetermined signal strength range.

Concretely, (1) when the received signal strength of the wireless communication device at this end is higher than the upper limit of the predetermined signal strength range, a request to decrease the transmission power is sent to the wireless communication device at the other end, and (2) when the received signal strength of the wireless communication device at this end is lower than the lower limit of the predetermined signal strength range, a request to increase the transmission power is sent to the wireless communication device at the other end.

The predetermined signal strength range is defined in the Bluetooth specifications, and is a range of approximately −60 dBm to −40 dBm, currently. More correctly, the lower limit falls within a range of −56 dBm to the actual sensitivity +6 dB, and the upper limit falls within a range higher than the lower limit by 20 dB±6 dB. In this way, according to the specifications, a certain amount of range is permitted for each of the lower and upper limits.

The wireless communication device at the other end which received the request described in the above (1) or (2) decreases or increases the transmission power in accordance with the request.

As a result of the above control performed by both the wireless communication device at this end and the wireless communication device at the other end, the transmission power of each of the wireless communication devices is controlled by the communication partner thereof.

<Problem Regarding Transmission Power Control Based on Bluetooth System>

Because an environment in a vehicle is relatively narrow space, the distance between wireless communication devices is short so that the propagation loss is small. Therefore, in a wireless communication in a vehicle, the received signal strength easily becomes higher than the upper limit of the predetermined signal strength range, and the control tends to be one which decreases the transmission powers of the wireless communication devices communicating with each other.

Further, the fact that the received signal strength tends to be high means that the received signal strength tends not to become lower than the lower limit of the predetermined signal strength range. Therefore, once the transmission power is decreased, the control tends not to become the one in the direction of increasing the transmission power of the wireless communication device.

As a result, the environment in a vehicle tends to be a state in which the received signal strength is decreased. As a result, in an environment in which an interference wave exists, the ratio of the reception power of a desired wave to that of a disturbing wave, i.e., the DUR (Desired to Undesired Signal Ratio) becomes small, and a packet error easily occurs.

As described above, in the specifications of the transmission power control based on the Bluetooth system, the transmission power of a wireless communication device at the other end is controlled in accordance with the received signal strength. Therefore, there is a problem that, even when there is room for improvement in the communication quality by increasing the transmission power, the request to increase the transmission power is not transmitted when the received signal strength falls within the predetermined signal strength range.

In order to solve the above-mentioned problems, for example, Patent Literature 1 discloses a technique of controlling transmission power appropriately in accordance with communication quality, such as a Bit Error Rate (BER) or a Signal to Noise Ratio (SNR).

Further, Patent Literature 2 discloses a technique of controlling the transmission power of the wireless communication device at the other end by sending a request to decrease transmission power to a wireless communication device at the other end periodically, even if the received signal strength of a wireless communication device at the this end falls within a predetermined signal strength range.

CITATION LIST

Patent Literature

Patent Literature 1: Japanese Unexamined Patent Application Publication No. 2004-208008
Patent Literature 2: Japanese Unexamined Patent Application Publication No. 2007-259055

Non Patent Literature

Non Patent Literature 1: BLUETOOTH SPECIFICATION Version 2.1+EDR [vol 2]

SUMMARY OF INVENTION

Technical Problem

The wireless communication device disclosed in above-mentioned Patent Literature 1 is configured so as to control the transmission power of a wireless communication device at this end in accordance with a result of monitoring of the communication quality of the wireless communication device at this end. This configuration is a special one being out of the Bluetooth specifications, while according to the Bluetooth specifications, the transmission power of the wireless communication device at this end is controlled in response to a request from the wireless communication device at the other end. Therefore, there is a problem that the wireless communication device at the other end has to include the same configuration as that of this end, and the wireless communication device at the other end which is communicable with the wireless communication device at this end is limited.

In above-mentioned Patent Literature 2, the transmission power of the wireless communication device at the other end can be controlled. However, the control of the transmission power of the wireless communication device at this end is not taken into consideration. In order to enable the control of the transmission power of the wireless communication device at this end as well, the wireless communication device at the other end also has to have the same configuration. Therefore, there is a problem that the wireless communication device at the other end, which provides an improvement in the communication quality of both the wireless communication devices at this end and at the other end, is limited.

As described above, according to above-mentioned Patent Literatures 1 and 2, the wireless communication device at the other end has to have a special function which is out of the Bluetooth specifications in order to perform the transmission power control on the wireless communication devices at this end and at the other end. Therefore, as the wireless communication device at the other end, a commercial apparatus, such as a smart phone which a user carries into a vehicle, cannot be used.

The present invention is made in order to solve the above-described problems, and it is therefore an object of the present invention to provide a technique to improve the communication quality of both a wireless communication devices at this end and at the other end, regardless of the wireless communication device at the other end.

Solution to Problem

A wireless communication device according to the present invention includes: a control unit performing a control of decreasing the received signal strength of each of the wireless communication device at this end and the wireless communication device at another end, when a communication state satisfies a condition for increasing the transmission power, to cause the wireless communication unit of the wireless communication device at this end to issue the transmission power control request to increase the transmission power to the wireless communication device at another end, and also cause the wireless communication unit of the wireless communication device at another end to issue the transmission power control request to increase the transmission power to the wireless communication device at this end.

Advantageous Effects of Invention

According to the present invention, a wireless communication device has a function of performing a control of decreasing the received signal strength of each of the wireless communication device at this end and the wireless communication device at another end, when a communication state satisfies a condition for increasing the transmission power, to cause the wireless communication unit of the wireless communication device at this end to issue the transmission power control request to increase the transmission power to the wireless communication device at another end, and also cause the wireless communication unit of the wireless communication device at another end to issue the transmission power control request to increase the transmission power to the wireless communication device at this end. As a result of such a configuration, it is possible to increase the transmission power of each of the wireless communication device at this end and the wireless communication device at the other end, so that both wireless communication devices can receive radio waves with high received signal strengths, and the communication quality is improved. Further, because any type of wireless communication device can be used as the wireless communication device at the other end as long as the wireless communication device at this end has the above-mentioned function, a commercial apparatus, such as a smart phone which the user carries into a moving object, can be used as the wireless communication device at the other end.

DESCRIPTION OF EMBODIMENTS

Hereafter, in order to explain this invention in more detail, some embodiments of the present invention will be described with reference to the accompanying drawings.
Embodiment 1.

Figure 1:
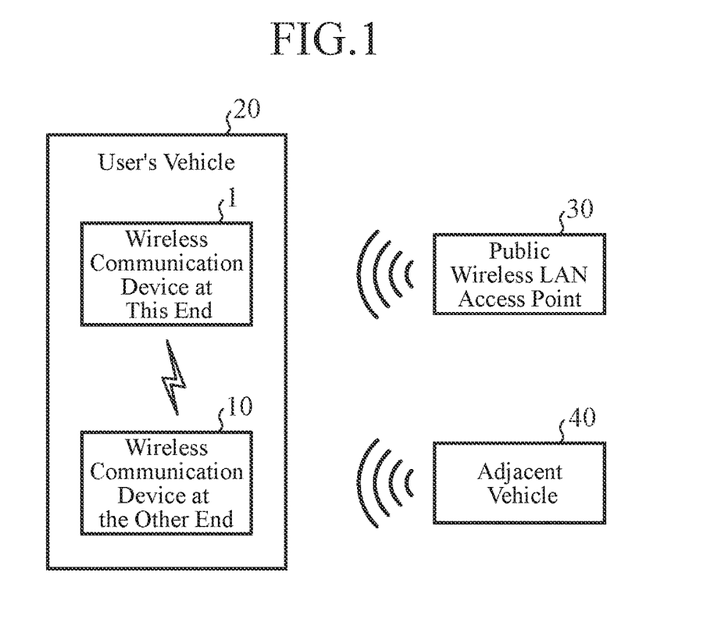
FIG. 1 is a diagram showing an example of a configuration of a wireless communication system including a wireless communication device at this end according to Embodiment 1 of the present invention.

FIG. 1 is a diagram showing an example of a configuration of a wireless communication system including a wireless communication device according to Embodiment 1. The wireless communication system includes at least a wireless communication device at this end 1 and a wireless communication device at the other end 10.

Some differences in configuration between the wireless communication device at this end 1 and the wireless communication device at the other end 10 will be described later.

As shown in FIG. 1, the wireless communication device at this end 1 and the wireless communication device at the other end 10 are mounted on a user's vehicle 20.

In the user's vehicle 20, wireless communications based on the Bluetooth system are carried out between the wireless communication device at this end 1 and the wireless communication device at the other end 10. Outside the user's vehicle 20, there exist a public wireless LAN access point 30 and an adjacent vehicle 40 in which a wireless LAN communication device is mounted. Thus, the wireless communication in the user's vehicle 20 receives interference caused by radio waves for wireless communications carried out outside the user's vehicle 20. Further, because a used channel differs between the public wireless LAN access point 30 and the wireless LAN communication device in the adjacent vehicle 40, a channel change and a level change occur in an interference wave dependently upon a positional relationship between the user's vehicle 20, the public wireless LAN access point 30 and the adjacent vehicle 40.

Figure 2:
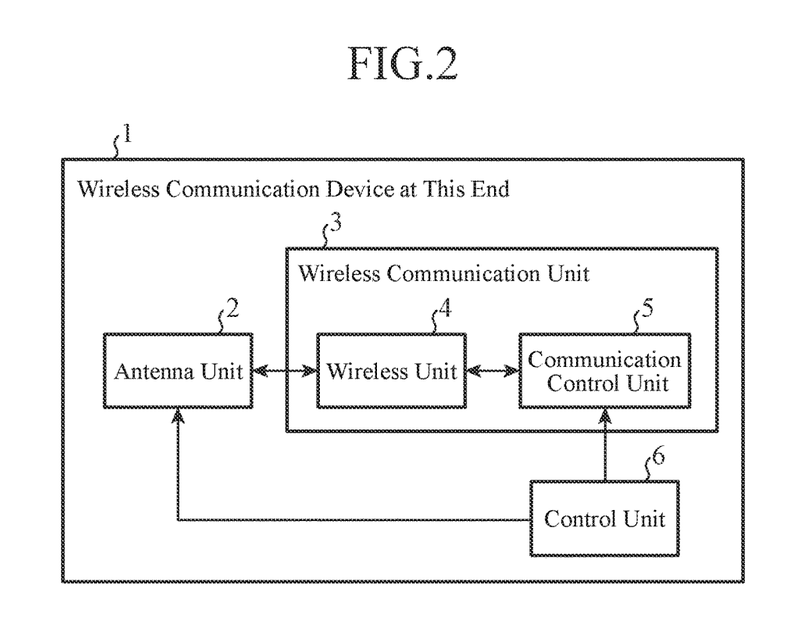
FIG. 2 is a block diagram showing an example of a configuration of the wireless communication device at this end according to Embodiment 1.

FIG. 2 is a block diagram showing an example of a configuration of the wireless communication device at this end 1.

An antenna unit 2 transmits and receives a radio wave to and from the wireless communication device at the other end 10. This antenna unit 2 is composed of an antenna (element), an antenna matching circuit, and so on.

A wireless communication unit 3 is a chip in which basic functions for the wireless communication in conformity with the Bluetooth specifications are installed, and implements the functions of a wireless unit 4 and a communication control unit 5.

The wireless unit 4 is composed of a receiving circuit that converts the radio wave received by the antenna unit 2 into a received signal, a transmitting circuit that outputs a transmission signal outputted from the communication control unit 5 to the antenna unit 2, and so on. Further, the wireless unit 4 detects the received signal strength (RSSI) of the radio wave from the wireless communication device at the other end 10, and outputs the received signal strength to the communication control unit 5.

The communication control unit 5 issues a transmission power control request to increase or decrease the transmission power to the wireless communication device at the other end 10 in such a way that the received signal strength of the radio wave from the wireless communication device at the other end 10 falls within a predetermined signal strength range. This control corresponds to the transmission power control request (Power Control Requests) defined in the Bluetooth specifications.

The communication control unit 5 also performs a transmission power control of the wireless unit 4 in response to a request to increase or decrease the transmission power from the wireless communication device at the other end 10. By increasing or decreasing the transmission power of the wireless unit 4, the radiation power of the antenna unit 2 is also increased or decreased. This control corresponds to the transmission power control (Power Control) defined in the Bluetooth specifications.

The predetermined signal strength range is, for example, a range of approximately −60 dBm to −40 dBm (so-called Golden Receive Power Range) defined in the Bluetooth specifications.

Hereafter, the transmission power control request issued by the communication control unit 5 will be explained.

When the received signal strength is lower than the lower limit of the predetermined signal strength range, the communication control unit 5 outputs a transmission signal for requesting an increase in the transmission power to the wireless communication device at the other end 10 via the wireless unit 4 and the antenna unit 2. When the received signal strength is higher than the upper limit of the predetermined signal strength range, the communication control unit 5 outputs a transmission signal for requesting a decrease in the transmission power to the wireless communication device at the other end 10 via the wireless unit 4 and the antenna unit 2.

In contrast with this, when the wireless communication device at the other end 10 issues a request to increase or decrease the transmission power to the wireless communication device at this end 1, the received signal representing this request is input to the communication control unit 5 via the antenna unit 2 and the wireless unit 4. When the input received signal is the one for requesting an increase in the transmission power, the communication control unit 5 instructs the wireless unit 4 to increase the transmission power. In contrast, when the input received signal is the one for requesting a decrease in the transmission power, the communication control unit 5 instructs the wireless unit 4 to decrease the transmission power.

It is assumed that pieces of information including a range of transmission power within which the transmission power can be changed, and an amount of change corresponding to one request are preset to the wireless communication unit 3.

Figure 3:
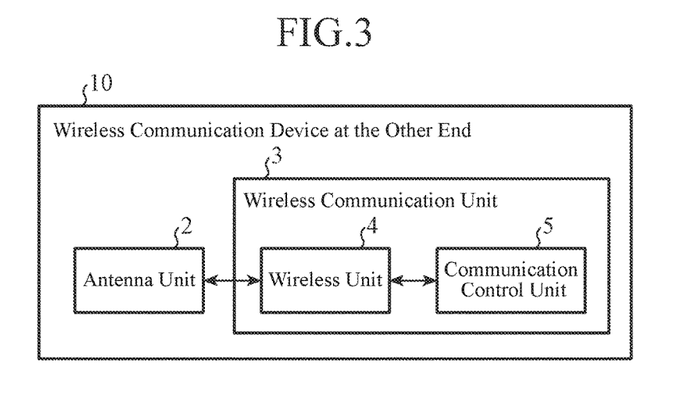
FIG. 3 is a block diagram showing an example of a configuration of a wireless communication device at the other end according to Embodiment 1.

An example of a configuration of the wireless communication device at the other end 10 is shown in FIG. 3. As shown in FIG. 3, the wireless communication device at the other end 10 includes at least an antenna unit 2 and a wireless communication unit 3. These antenna unit 2 and wireless communication unit 3 have the same functions as those of the wireless communication device at this end 1.

The wireless communication unit 3 of the wireless communication device at the other end 10 also performs a transmission power control, like the wireless communication unit 3 of the wireless communication device at this end 1. Namely, the wireless communication unit 3 of the wireless communication device at the other end 10 issues a transmission power control request to increase or decrease the transmission power to the wireless communication device at this end 1, which is a partner at the other end of communication, in such a way that the received signal strength of the radio wave from the wireless communication device at this end 1 falls within the above-mentioned predetermined signal strength range, and also performs a transmission power control of a wireless unit 4 of the wireless communication device at the other end 10 in response to the request to increase or decrease the transmission power from the wireless communication device at this end 1.

A control unit 6 of the wireless communication device at this end 1 is composed of a CPU (Central Processing Unit) or a dedicated circuit. The control unit 6 determines whether the state of communication between the wireless communication device at this end 1 and the wireless communication device at the other end 10 satisfies a predetermined condition for performing control. When the state of the communication satisfies the condition for performing control, the control unit 6 instructs the antenna unit 2 or the communication control unit 5 to perform a control of decreasing the received signal strength of the wireless communication device at this end 1 and that of the wireless communication device at the other end 10, whereas when the state of the communication does not satisfy the condition, such a control is not performed.

The condition for performing control shows a state in which it is necessary to increase the transmission power in the wireless communication between the wireless communication device at this end 1 and the wireless communication device at the other end 10. Some concrete examples of the condition for performing control will be explained in Embodiments 2 to 5. Some concrete examples of the control performed by the control unit 6 will be explained in Embodiments 6 to 8.

When wireless communication is used in the user's vehicle 20, since the environment in the vehicle is generally narrow space, the distance between the wireless communication device at this end 1 and the wireless communication device at the other end 10 is short and hence the propagation loss is small. Therefore, the received signal strength tends not to become lower than the upper limit of the predetermined signal strength range, and the control tends to be one to decrease the transmission power. To solve this problem, a communication state in which the transmission power of the wireless communication device at this end 1 and that of the wireless communication device at the other end 10 are to be increased is preset, as the condition for performing control, to the control unit 6, and, when the communication state becomes a state to satisfy the condition, the control unit 6 performs the control of decreasing the received signal strength of the wireless communication device at this end 1 and that of the wireless communication device at the other end 10.

When the received signal strength of the wireless communication device at this end 1 becomes lower than the lower limit of the predetermined signal strength range as a result of the control performed by the control unit 6, the wireless communication unit 3 of the wireless communication device at this end 1 issues a transmission power control request to increase the transmission power to the wireless communication device at the other end 10. In response to this request, the wireless communication unit 3 of the wireless communication device at the other end 10 increases the transmission power of the wireless unit 4.

Further, when the received signal strength of the wireless communication device at the other end 10 becomes lower than the lower limit of the predetermined signal strength range as a result of the control performed by the control unit 6, the wireless communication unit 3 of the wireless communication device at the other end 10 issues a transmission power control request to increase the transmission power to the wireless communication device at this end 1. In response to this request, the wireless communication unit 3 of the wireless communication device at this end 1 increases the transmission power of the wireless unit 4.

As described above, the control unit 6 of the wireless communication device at this end 1 performs the control of decreasing the received signal strength, and as a result, both the transmission power of the wireless communication device at this end 1 and that of the wireless communication device at the other end 10 are increased.

In the above explanation, the control unit 6 performs the control in two steps of maintaining or decreasing the current received signal strength of the wireless communication device at this end 1 and that of the wireless communication device at the other end 10. However, the control unit 6 can alternatively perform the control by controlling the decreasing amount of the received signal strength to be multi-level.

As described above, in Embodiment 1, each of the wireless communication device at this end 1 and the wireless communication device at another end 10 includes a wireless communication unit 3 issuing a transmission power control request to increase or decrease transmission power to the wireless communication device at another end in such a way that a received signal strength of a radio wave transmitted from a wireless communication device at another end and received by a wireless communication device at this end falls within a predetermined range, and performing a transmission power control of a wireless communication device at this end in response to a request to increase or decrease transmission power from a wireless communication device at another end. The wireless communication device at this end 1 includes a control unit 6 performing a control of decreasing the received signal strength of each of the wireless communication device at this end 1 and the wireless communication device at another end 10, when a communication state satisfies a condition for increasing the transmission power, to cause the wireless communication unit 3 of the wireless communication device at this end 1 to issue the transmission power control request to increase the transmission power, and also cause the wireless communication unit 3 of the wireless communication device at another end 10 to issue the transmission power control request to increase the transmission power to the wireless communication device at this end. As a result, also in an environment in which the propagation loss is small and the control tends to be one which decreases the transmission power, such as in the environment in a vehicle, by disposing the control unit 6 only in the wireless communication device at this end 1, both the transmission power of the wireless communication device at this end 1 and that of the wireless communication device at the other end 10 can be increased, and both of them can receive a radio wave with a high received signal strength. Because the reception power of a desired wave can be increased, the ratio of the reception power of the desired wave to that of a disturbing wave, i.e. the DUR can be improved, and the occurrence of packet errors can be reduced, also in an environment in which a lot of interference waves exist. Therefore, the communication quality is improved. Further, because any type of wireless communication device is used as the wireless communication device at the other end 10 as long as only the wireless communication device at this end 1 includes the control unit 6, a commercially available apparatus, such as a smart phone which the user carries into the user's vehicle 20, can be used as the wireless communication device at the other end 10.

Some examples of the DUR are listed below: CNR (Carrier to Noise Ratio), CIR (Carrier to Interference Ratio), CINR (Carrier to Interference and Noise Ratio), and the like.
Embodiment 2.

In Embodiment 2, some concrete examples of the condition for performing control based on which the transmission power is to be increased will be explained. A wireless communication device at this end 1 and a wireless communication device at the other end 10 which construct a wireless communication system according to Embodiment 2 are the same as those according to above-described Embodiment 1. Therefore, the aforementioned FIGS. 1 to 3 are also used for the explanation of Embodiment 2.

In Embodiment 2, a condition for performing control is set so that the control is performed within a time period before communication of data packets is started. When the current time is within a connection control time period before communication of data packets is started, a control unit 6 performs a control of decreasing the received signal strength of the wireless communication device at this end 1 and that of the wireless communication device at the other end 10, whereas during communication of data packets is performed the control unit 6 does not perform this control.

Figure 4:
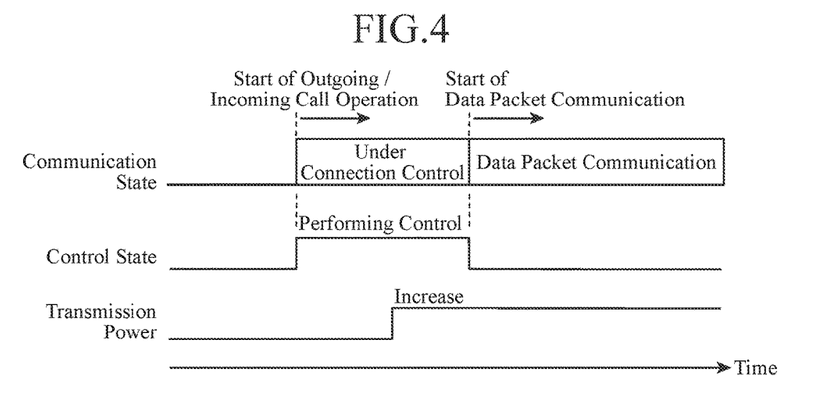
FIG. 4 is a timing chart of a wireless communication performed by a wireless communication device at this end according to Embodiment 2 of the present invention.

FIG. 4 is a timing chart of wireless communication of the wireless communication device at this end 1, and shows the communication state of the wireless communication device at this end 1, the control state of the control unit 6 (whether or not the control is performed), and a time transition of the transmission power of the wireless communication device at this end 1.

For example, when communication of data for hands free call is carried out between the wireless communication device at this end 1 and the wireless communication device at the other end 10, the control unit 6 issues an instruction to an antenna unit 2 when triggered by an outgoing or incoming call operation which is performed before communication of data packets is started, so as to start the control of decreasing the received signal strength of the wireless communication device at this end 1 and that of the wireless communication device at the other end 10. The control unit 6 continues the control of decreasing the received signal strengths while the user is inputting the phone number of a call destination to the wireless communication device at this end 1 or while a wireless communication unit 3 is controlling a connection with the wireless communication device at the other end 10. When a start of communication of voice data packets after an establishment of connection is notified from the communication control unit 5, the control unit 6 stops the control of decreasing the received signal strengths.

As a result, before communication of data packets is started, the received signal strength of the wireless communication device at this end 1 and that of the wireless communication device at the other end 10 are decreased temporarily. As a result, a request to increase the transmission power is transmitted from the wireless communication device at the other end 10 to the wireless communication device at this end 1, so that the transmission power of the wireless communication device at this end 1 is increased. Further, a request to increase the transmission power is transmitted from the wireless communication device at this end 1 to the wireless communication device at the other end 10, so that the transmission power of the wireless communication device at the other end 10 is also increased.

After communication of data packets is started, the wireless communication system returns to a state in which the received signal strength of the wireless communication device at this end 1 and that of the wireless communication device at the other end 10 are not decreased.

As described above, according to Embodiment 2, because the condition for performing control is set so that the control is performed within a time period before communication of data packets is started, the wireless communication device at this end 1 and the wireless communication device at the other end 10 can start communication of data packets with each other in a state in which the transmission powers thereof have been increased, and therefore the communication quality is improved.

Embodiment 3.

A wireless communication device at this end 1 and a wireless communication device at the other end 10 which construct a wireless communication system according to Embodiment 3 are the same as those according to above-mentioned Embodiment 1. Therefore, the aforementioned FIGS. 1 to 3 are also used for the explanation of Embodiment 3.

In Embodiment 3, a condition for performing control is that a ratio (DUR) of the reception power of a desired wave to that of a disturbing wave is lower than or equal to a reference value. A communication control unit 5 detects the DUR during communication of data packets, and notifies a control unit 6 of the detection result. When the DUR is lower than or equal to the reference value, the control unit 6 performs a control of decreasing the received signal strength of the wireless communication device at this end 1 and that of the wireless communication device at the other end 10, whereas when the DUR is higher than the reference value, the control unit 6 does not perform this control.

The reference value of the DUR is the one which satisfies a required DUR determined in accordance with a modulation method for communication data. However, in consideration of an improvement amount of the received signal strength after the control of decreasing the received signal strengths is stopped, different values may be adopted for the reference value which is used to determine whether or not to start the control and another reference value which is used to determine whether or not to stop the control.

Figure 5:
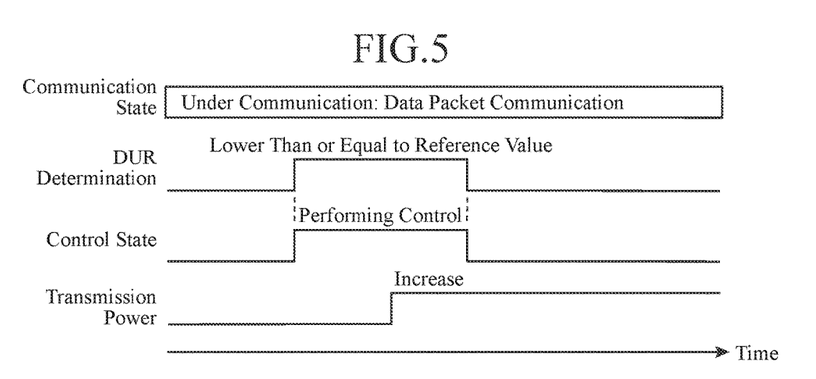
FIG. 5 is a timing chart of a wireless communication performed by a wireless communication device at this end according to Embodiment 3 of the present invention.

FIG. 5 is a timing chart of wireless communication of the wireless communication device at this end, 1 and shows the communication state of the wireless communication device at this end 1, the determination result of the DUR performed by the control unit 6, the control state of the control unit 6 (whether or not the control is performed) and a time transition of the transmission power of the wireless communication device at this end 1.

When the DUR notified from the communication control unit 5 to the control unit 6 becomes lower than or equal to the reference value, the control unit 6 issued an instruction to an antenna unit 2 or the communication control unit 5, so as to start the control of decreasing the received signal strength of the wireless communication device at this end 1 and that of the wireless communication device at the other end 10. As a result, a request to increase the transmission power is transmitted from the wireless communication device at this end 1 to the wireless communication device at the other end 10, so that the transmission power of the wireless communication device at the other end 10 is increased. When the DUR detected by the communication control unit 5 of the wireless communication device at this end 1 becomes high and then exceeds the reference value as a result of the increase in the transmission power of the wireless communication device at the other end 10, the control unit 6 stops the control of decreasing the received signal strengths. Further, as a result of the decrease in the received signal strength of the wireless communication device at the other end 10, a request to increase the transmission power is transmitted from the wireless communication device at the other end 10 to the wireless communication device at this end 1, so that the transmission power of the wireless communication device at this end 1 is increased, and the DUR of the wireless communication device at the other end 10 becomes high.

As described above, according to Embodiment 3, because the condition for performing control is that the DUR is lower than or equal to a reference value, the transmission power of the wireless communication device at this end 1 and that of the wireless communication device at the other end 10 can be increased when it is necessary to improve the DUR.
Embodiment 4.

A wireless communication device at this end 1 and a wireless communication device at the other end 10 which construct a wireless communication system according to Embodiment 4 are the same as those according to abovementioned Embodiment 1. Therefore, the aforementioned FIGS. 1 to 3 are also used for the explanation of Embodiment 4.

While in above Embodiment 3, a condition for performing control is that the DUR is lower than or equal to a reference value, in this Embodiment 4 a timeout is set to this condition in such a way that the condition for performing control is that the current time is within a time period before a lapse of a predetermined time after the DUR has become lower than or equal to the reference value.

As the predetermined time, for example, a short time (e.g. 1 to 3 seconds) during which the user does not recognize a deterioration of the communication state due to decrease in the received signal strength is set.

Figure 6:
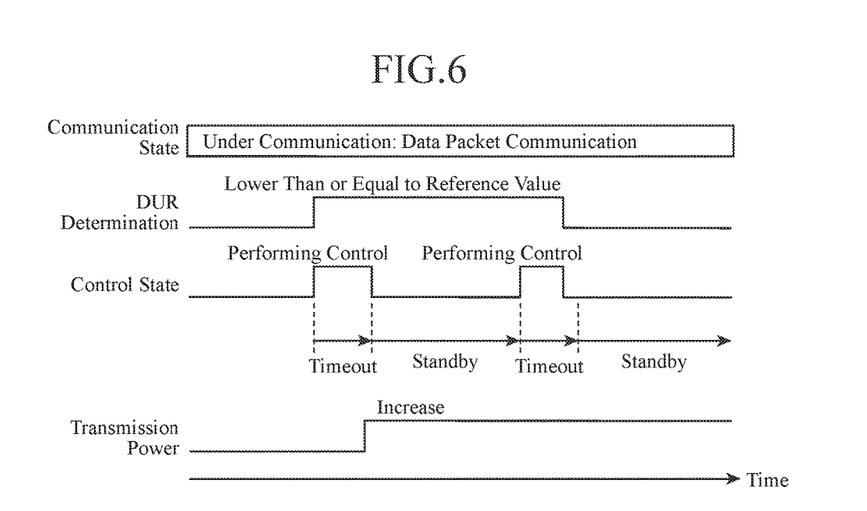
FIG. 6 is a timing chart of a wireless communication performed by a wireless communication device at this end according to Embodiment 4 of the present invention.

FIG. 6 is a timing chart of wireless communications of the wireless communication device at this end 1, and shows the communication state of the wireless communication device at this end 1, a determination result of DUR performed by a control unit 6, the control state of the control unit 6 (whether or not the control is performed) and a time transition of the transmission power of the wireless communication device at this end 1.

The control unit 6 performs determination of the DUR every 10 seconds, for example. The control unit 6 then starts the control of decreasing the received signal strengths at the time that the DUR becomes lower than or equal to the reference value which serves as a starting time of the control, and stops this control after a lapse of a predetermined time (e.g. 1 to 3 seconds). There is a case in which the DUR does not increase up to the reference value even if the transmission power of the wireless communication device at the other end 10 is increased, depending on a radio wave environment in which the levels of interference waves from a public wireless LAN access point 30 or an adjacent vehicle 40 are high, for example. In this case, by setting such a timeout as above, the continuation of the state in which the received signal strengths are decreased by the control of the control unit 6 is prevented, and the wireless communication system is returned to its original state in which the received signal strengths are not decreased.

Further, also when the DUR becomes higher than the reference value before a lapse of the predetermined time after the control unit 6 has started the control of decreasing the received signal strengths, the control unit 6 stops this control.

As described above, according to Embodiment 4, because the condition for performing control is that the current time is within a time period before a lapse of the predetermined time after the DUR has become lower than or equal to the reference value, when the DUR is not improved up to the reference value, continuation of the state in which the received signal strengths are decreased is prevented, and the wireless communication system is returned to its original state in which the received signal strengths are not decreased to carry out communication.
Embodiment 5.

A wireless communication device at this end 1 and a wireless communication device at the other end 10 which construct a wireless communication system according to Embodiment 5 are the same as those according to abovementioned Embodiment 1. Therefore, the aforementioned FIGS. 1 to 3 are also used for the explanation of Embodiment 5.

In the control according to any one of above-mentioned Embodiments 1 to 4, by increasing the transmission power of the wireless communication device at this end 1 and that of the wireless communication device at the other end 10, both the wireless communication devices 1, 10 are enabled to receive operation with high received signal strengths. However, because during communication of data packets the transmission power is controlled in accordance with an original received signal strength, there is a possibility that the received signal strength becomes higher than the upper limit of the predetermined signal strength range, and the control in the direction of decreasing the transmission power is performed.

Thus, in Embodiment 5, by making it difficult for the received signal strengths to become higher than the upper limit of the predetermined signal strength range during communication of data packets, it becomes easy to avoid the control in the direction of decreasing the transmission power.

In Embodiment 5, a condition for performing control is that the current time is a time of communicating a control packet for controlling wireless communication after communication of data packets are started. During communication of data packets, a control unit 6 performs a control of decreasing the received signal strength of the wireless communication device at this end 1 and that of the wireless communication device at the other end 10 at the time that a packet to be transmitted is of control packet type, whereas the control unit 6 does not perform this control at the time that the data packet to be transmitted is of data packet type.

In wireless communications based on the Bluetooth system, a control packet is one for maintaining a link and controlling communications, and a packet, such as NULL, POLL, FHS or DM1, is provided as a control packet. Because a low data rate of 1 Mbps, which is called the Basic Rate, is used for communication of a control packet, the influence of a disturbing wave or the like on the control packets is low even if the received signal strength is low compared with that at the time of communication of data packets.

As data packets, SCO or eSCO packets on which hands free voice data are carried, ACL packets on which Bluetooth audio data or normal user data are carried, or the likes are provided. For communication of data packets, a data rate of 2 Mbps or more, which is called the Enhanced Data Rate, is used in many cases.

A communication control unit 5 notifies the control unit 6 of the packet type.

Figure 7:
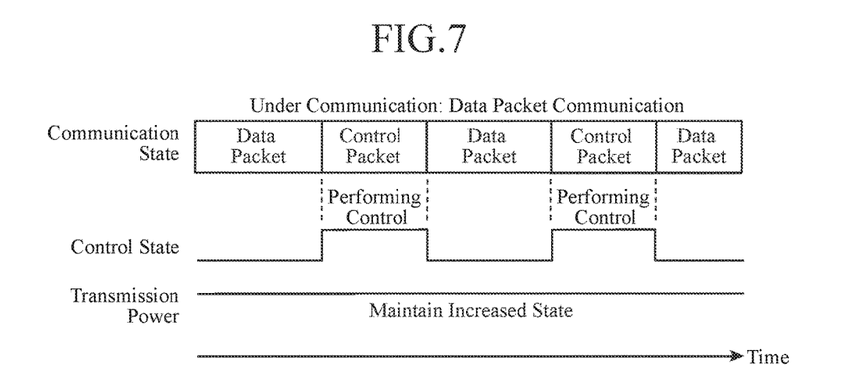
FIG. 7 is a timing chart of a wireless communication performed by a wireless communication device at this end according to Embodiment 5 of the present invention.

FIG. 7 is a timing chart of wireless communication of the wireless communication device at this end 1, and shows the communication state of the wireless communication device at this end 1, the control state of the control unit 6 (whether or not the control is performed), and a time transition of the transmission power of the wireless communication device at this end 1. In this diagram, a state in which the wireless communication device at this end 1 and the wireless communication device at the other end 10 have already been connected to each other, and communication of data packets is already started is shown.

In accordance with the packet type notified from the communication control unit 5, the control unit 6 performs the control of decreasing the received signal strengths when the packet type is a control packet, whereas the control unit returns the wireless communication system to its original state in which the received signal strengths are not decreased when the packet type is a data packet. By performing this control, at the time that a control packet is communicated, the received signal strengths become low compared with those at the time that a data packet is communicated, and the moving average of the received signal strengths during communication of data packets is decreased. Therefore, the received signal strengths tends not to become higher than the upper limit of the predetermined signal strength range, and the control of decreasing the transmission power can be easily prevented.

As described above, according to Embodiment 5, because the condition for performing control is that the current time is a time of communicating a control packet after communication of data packets is started, the control of decreasing the transmission power can be easily prevented from being performed during communication of data packets, so that the communication quality is improved.

Embodiment 6.

In Embodiment 6, a concrete example of a control of decreasing the received signal strength of a wireless communication device at this end 1 and that of a wireless communication device at the other end 10 will be explained.

Figure 8:
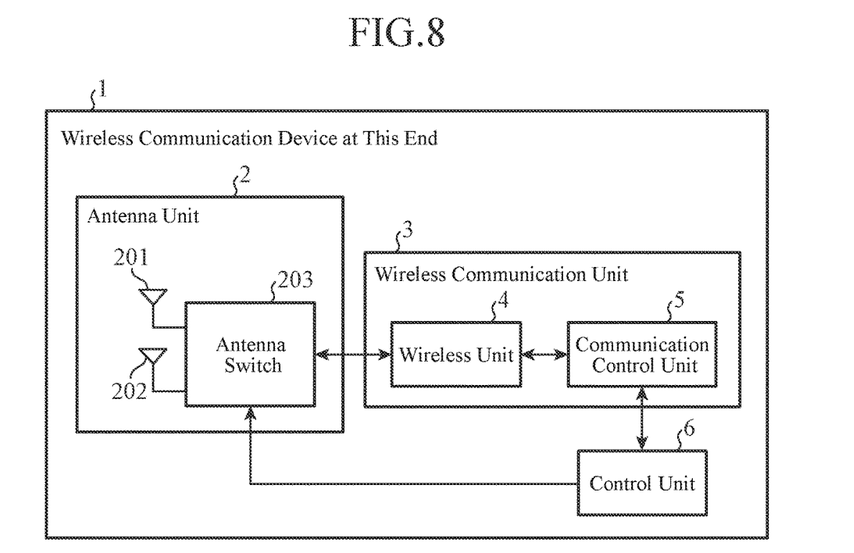
FIG. 8 is a block diagram showing an example of a configuration of a wireless communication device at this end according to Embodiment 6.

FIG. 8 is a block diagram showing an example of a configuration of the wireless communication device at this end according to Embodiment 6. In FIG. 8, the same or corresponding components as those shown in FIG. 2 are designated by the same reference numerals, and the explanation thereof will be omitted hereafter. As shown in FIG. 8, an antenna unit 2 of the wireless communication device at this end 1 includes a first antenna 201, a second antenna 202, and an antenna switch 203. It is assumed that the first antenna 201 has good characteristics (for example, the first antenna is a whip antenna), and the second antenna 202 has bad characteristics (for example, the second antenna is an internal antenna). The antenna switch 203 switches between the first antenna 201 having good characteristics and the second antenna 202 having bad characteristics in accordance with an instruction from a control unit 6.

As the first and second antennas 201 and 202, two antennas for diversities can be used. As an alternative, in a case in which a wireless communication unit 3 is a combo chip which supports the Bluetooth and the wireless LAN, two antennas for MIMO (Multiple-Input and Multiple-Output) can be used as the first and second antennas 201 and 202.

When the state of wireless communications satisfies the condition for performing control, the control unit 6 outputs an instruction to switch from the first antenna 201 to the second antenna 202 to the antenna switch 203. As the antenna characteristics of the wireless communication device at this end 1 degrade, the received signal strength of the wireless communication device at this end 1 is decreased. Further, because the antenna characteristics of the wireless communication device at this end 1 degrade, the radiation power at a time of transmission is decreased, so that it is possible to decrease the received signal strength of the wireless communication device at the other end 10.

When the state of wireless communications does not satisfy the condition for performing control, the control unit 6 outputs an instruction to switch from the second antenna 202 to the first antenna 201 to the antenna switch 203. By returning the wireless communication device at this end 1 to a state in which the antenna characteristics of the wireless communication device at this end 1 do not degrade, the received signal strength of the wireless communication device at this end 1 is also returned to its original state in which it is not decreased. Further, by returning the wireless communication device at this end 1 to the state in which the antenna characteristics of the wireless communication device at this end 1 do not degrade, the radiation power at a time of transmission is also returned to its original state in which it is not decreased, and as a result, the received signal strength of the wireless communication device at the other end 10 can also be returned to its original state in which it is not decreased.

As described above, in Embodiment 6, the control unit 6 decreases the received signal strength of the wireless communication device at this end 1 and that of the wireless communication device at the other end 10 by degrading the antenna characteristics of the wireless communication device at this end 1. Therefore, by disposing the control unit 6 only in the wireless communication device at this end 1, both the transmission power of the wireless communication device at this end 1 and that of the wireless communication device at the other end 10 can be increased.

Further, according to Embodiment 6, the wireless communication device at this end 1 includes a plurality of antennas having different characteristics, and the control unit 6 switches the antenna among the plurality of antennas so as to degrade the antenna characteristics of the wireless communication device at this end 1. Therefore, the present invention can be applied to a wireless communication device without increasing the number of antennas as long as the wireless communication device includes a plurality of antennas for diversity or MIMO.

Although in the example shown in FIG. 8 the wireless communication device at this end 1 is configured so as to switch between the two antennas having different characteristics, the wireless communication device can be alternatively configured so as to include three or more antennas and switch among these antennas. In the case of such a configuration, because the antenna characteristics can be changed in multiple steps, the decreasing amount of the received signal strengths can be controlled in multiple steps, and therefore the influence on the communication due to excessive degradation of the antenna characteristics can be reduced.

Embodiment 7.

While in above-mentioned Embodiment 6 switching of the antenna characteristics is implemented by using a plurality of antennas, in this Embodiment 7, switching of the antenna characteristics is implemented with a single antenna.

Figure 9:
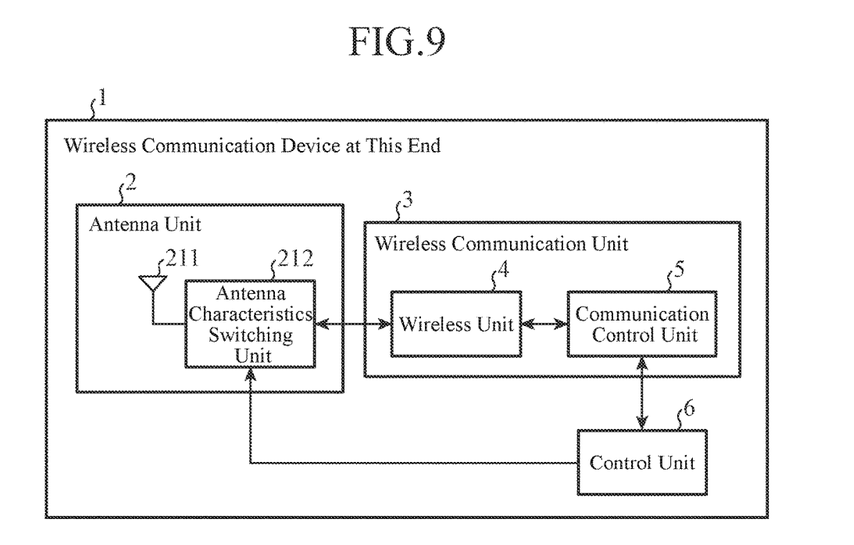
FIG. 9 is a block diagram showing an example of a configuration of a wireless communication device at this end according to Embodiment 7.

FIG. 9 is a block diagram showing an example of the configuration of a wireless communication device at this end according to Embodiment 7. In FIG. 9, the same or corresponding components as those shown in FIGS. 2 and 8 are designated by the same reference numerals, and the explanation thereof will be omitted hereafter. As shown in FIG. 9, an antenna unit 2 of the wireless communication device at this end 1 includes an antenna 211 and an antenna characteristics switching unit 212. The antenna characteristics switching unit 212 switches between good characteristics and bad characteristics of the antenna unit 2 in accordance with an instruction from a control unit 6. As the antenna characteristics switching unit 212, for example, a matching circuit that can change impedance matching, a variable attenuator that can change a gain, or the like can be used.

When the state of wireless communications satisfies a condition for performing control, the control unit 6 outputs an instruction to degrade the antenna characteristics to the antenna characteristics switching unit 212. The antenna characteristics switching unit 212 degrades the characteristics of the antenna unit 2 in accordance with this instruction, so that the received signal strength of the wireless communication device at this end 1 is decreased. Further, because the radiation power at a time of transmission is decreased as the characteristics of the antenna unit 2 degrades, it is possible to decrease the received signal strength of a wireless communication device at the other end 10.

When the state of wireless communications does not satisfy the condition for performing control, the control unit 6 outputs an instruction to improve the antenna characteristics to the antenna characteristics switching unit 212. In accordance with this instruction, the antenna characteristics switching unit 212 returns to a state in which the characteristics of the antenna unit is not degraded, so that the wireless communication device at this end 1 returns to its original state in which the received signal strength thereof is not decreased. Further, by returning the antenna unit 2 to the state in which the characteristics thereof is not degraded, the radiation power at a time of transmission is also returns to its original state in which it is not degraded, and as a result, the wireless communication device at the other end 10 also returns to its original state in which the received signal strength thereof is not degraded.

As described above, in Embodiment 7, the control unit 6 is configured so as to degrade the antenna characteristics of the wireless communication device at this end 1 by changing the antenna characteristics of the single antenna, so that the present invention can be applied to a wireless communication device even if the wireless communication device includes only one antenna.

In the example of FIG. 9, the antenna characteristics switching unit 212 is configured so as to switch the characteristics of the antenna between the two states of good state and bad state. As an alternative, the antenna characteristics switching unit can be configured so as to switch among multiple antenna characteristics states. In the case of this configuration, because the antenna characteristics switching unit 212 can switch among the multiple antenna characteristics states, the decreasing amount of the received signal strengths can be controlled in multiple steps, and therefore the influence on the communication due to excessive degradation of the antenna characteristics can be reduced.

Embodiment 8.

A wireless communication device at this end 1 and a wireless communication device at the other end 10 which construct a wireless communication system according to Embodiment 8 are the same as those according to above-mentioned Embodiment 1. Therefore, the aforementioned FIGS. 1 to 3 are also used for the explanation of Embodiment 8.

In above-described Embodiments 6 and 7, the wireless communication system is configured so as to decrease the received signal strengths by switching antenna characteristics. In this Embodiment 8, the wireless communication system is configured so as to decrease the received signal strength by switching between channels (frequency bands) used for wireless communication.

Figure 10:
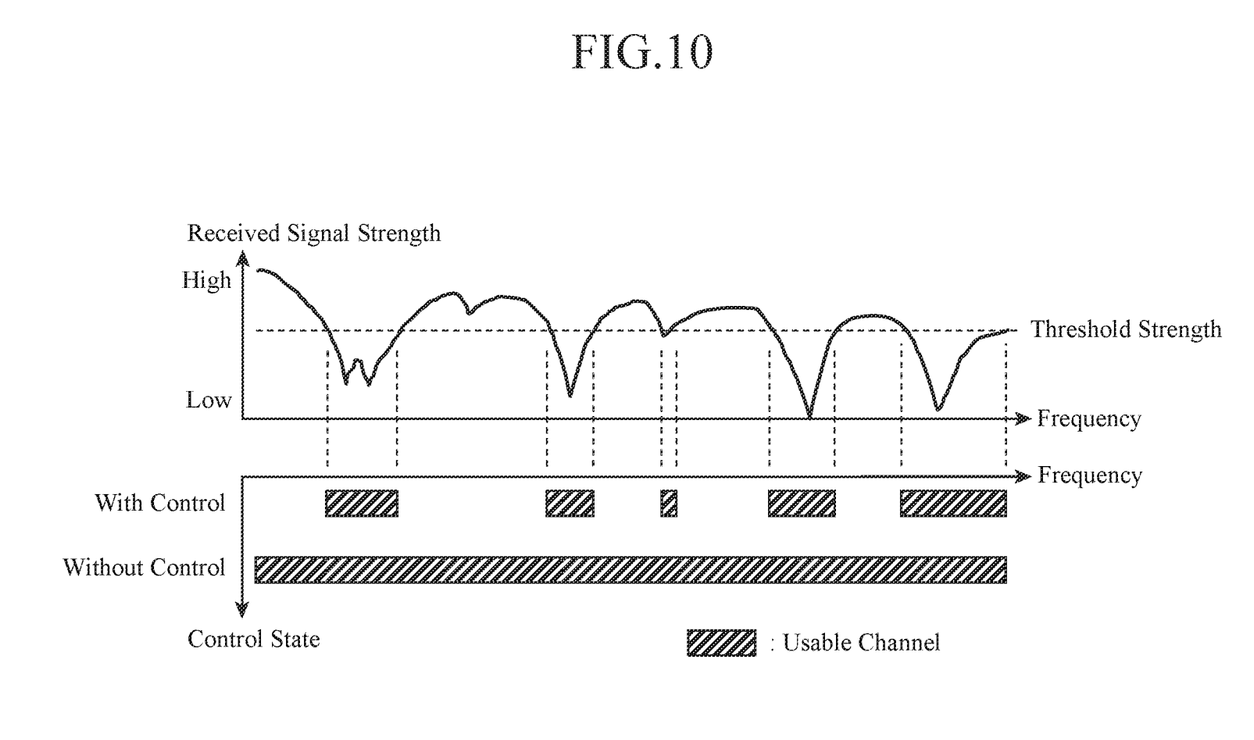
FIG. 10 is a diagram explaining channels (frequency bands) which a wireless communication device at this end according to Embodiment 8 of the present invention uses for communications.

FIG. 10 is a diagram for explaining channels which the wireless communication device at this end 1 according to Embodiment 8 uses for communication, and shows a relation between the frequency and the received signal strength, and a relation between the frequency and the control state of a control unit 6 (whether or not the control is performed).

According to the Bluetooth specifications, it is possible to assign channels which can be used for communication in the automatic frequency hopping (AFH) operation. In Embodiment 8, this system is used.

The inside of a vehicle is space enclosed by metal. A feature of the radio wave propagation environment in a vehicle is that there is a large variation in the propagation loss among channels due to multiple reflection (multipath). Therefore, the received signal strength varies for each of the channels. When a channel having a large propagation loss is used for wireless communication, the received signal strength of the wireless communication device at this end 1 and that of the wireless communication device at the other end 10 become low.

The control unit 6 issues an instruction for a communication control unit 5 to cause this communication control unit to initially perform wireless communications by using a lot of channels. Because a channel is made available for every 1 MHz in the 2.4 GHz band, namely, total 79 channels are made available, according to the Bluetooth specifications, it is desirable to cause this communication control unit 6 to initially perform wireless communication by using all the 79 channels.

The communication control unit 5 acquires the received signal strength for each of the channels, and notifies the control unit 6 of the received signal strengths. The control unit 6 extracts channels having low received signal strengths by comparing each of the received signal strengths notified from the communication control unit 5 with a threshold strength. It is necessary to use 20 channels or more for the AFH operation. Therefore, it is desirable to set the threshold strength in such a way that 20 or more channels each of which is determined to have a low received signal strength are extracted.

The control unit 6 sets the plurality of extracted channels as channels usable for the AFH operation. Namely, a channel whose received signal strength is lower than the threshold strength can be used for the AFH operation, and a channel whose received signal strength is higher than or equal to the threshold strength cannot be used for the AFH operation.

Then, when the state of wireless communications satisfies the condition for performing control, the control unit 6 issues an instruction to notify the communication control unit 5 of the usable channels to cause the communication control unit 5 to use channels included in the usable channels for the AFH operation. As a result, because the channel used for wireless communication is switched to a channel having a large propagation loss, it is possible to decrease the received signal strength of the wireless communication device at this end 1 and that of the wireless communication device at the other end 10.

When the state of wireless communications does not satisfy the condition for performing control, the control unit 6 performs an instruction to notify the communication control unit 5 that all channels can be used to cause the communication control unit 5 to use channels from among all channels for the AFH operation. As a result, the wireless communication system returns to a state in which the received signal strength of the wireless communication device at this end 1 and that of the wireless communication device at the other end 10 are not decreased. Alternatively, when the state of wireless communications does not satisfy the condition for performing control, the control unit enables the communication control unit to use channels whose received signal strengths are higher than or equal to the threshold strength, instead of using channels from among all the channels.

As described above, in Embodiment 8, the control unit 6 is configured so as to change the frequency band which the communication control unit 5 uses for communication, thereby decreasing the received signal strength of the wireless communication device at this end 1 and that of the wireless communication device at the other end 10. As a result, by disposing the control unit 6 only in the wireless communication device at this end 1, both the transmission power of the wireless communication device at this end 1 and that of the wireless communication device at the other end 10 can be increased.

In the above explanation, the example of applying the configuration according to any one of above Embodiments 1 to 8 to a wireless communication device that performs wireless communications based on the Bluetooth system is shown. However, the wireless communication is not limited to one based on the Bluetooth system, and the configuration can be applied to any wireless communication devices as long as the wireless communication device has a transmission power control function.

The configuration according to any one of the above-mentioned embodiments can be effective especially for a wireless communication device used in a vehicle, e.g. an in-vehicle device, such as a car navigation device, a display audio device and an integrated instrument panel, and a mobile device which is carried into a vehicle by a user, such as a smart phone, a tablet terminal and an audio player. Further, although in the above explanation, the configuration shown in each of above Embodiments 1 to 8 is applied to an in-vehicle device, the configuration can be applied to devices for other moving objects, such as persons, railroad vehicles, ships and airplanes, as well as to vehicles.

In addition to the above-described embodiments, it is to be understood that, any combination of two or more of the above-mentioned embodiments can be made, various modifications can be applied to any component according to any one of the above-mentioned embodiments, and any component according to any one of the above-mentioned embodiments can be omitted within the scope of the invention.

INDUSTRIAL APPLICABILITY

Because a wireless communication device according to the present invention controls the transmission power of a wireless communication device at this end and that of a wireless communication device at the other end, it is suitable for use as a wireless communication device or the likes that are used in narrow space such as the inside of a vehicle.

REFERENCE SIGNS LIST

1 wireless communication device at this end, 2 antenna unit, 3 wireless communication unit, 4 wireless unit, 5 communication control unit, 6 control unit, 10 wireless communication device at the other end, 20 user's vehicle, 30 public wireless LAN access point, 40 adjacent vehicle, 201 first antenna, 202 second antenna, 203 antenna switch, 211 antenna, and 212 antenna characteristics switching unit.

The invention claimed is:

1. A wireless communication device at this end that communicates with a wireless communication device at another end, the wireless communication device at this end comprising:
a wireless communication unit issuing a transmission power control request to increase or decrease transmission power to the wireless communication device at another end in such a way that a received signal strength of a radio wave transmitted from the wireless communication device at another end and received by the wireless communication device at this end falls within a predetermined range, and performing a transmission power control of the wireless communication device at this end in response to a request to increase or decrease transmission power from the wireless communication device at another end; and
a control unit performing a control of decreasing the received signal strength of each of the wireless communication device at this end and the wireless communication device at another end, when a communication state satisfies a condition for increasing the transmission power, to cause the wireless communication unit of the wireless communication device at this end to issue the transmission power control request to increase the transmission power to the wireless communication device at another end, and also cause the wireless communication unit of the wireless communication device at another end to issue the transmission power control request to increase the transmission power to the wireless communication device at this end.

2. The wireless communication device according to claim 1, wherein the condition is that a current time is within a time period before communication of data packet is started.

3. The wireless communication device according to claim 1, wherein the condition is that a ratio of a reception power of a desired wave to a reception power of a disturbing wave is lower than or equal to a reference value.

4. The wireless communication device according to claim 1, wherein the condition is that a current time is within a time period before a lapse of a predetermined time after a ratio of a reception power of a desired wave to a reception power of a disturbing wave becomes lower than or equal to a reference value.

5. The wireless communication device according to claim 1, wherein the condition is that a current time is a time of communicating a control packet after communication of data packet is started.

6. The wireless communication device according to claim 1, wherein the control unit degrades antenna characteristics of the wireless communication device at this end to decrease both the received signal strength of the wireless communication device at this end, and the received signal strength of the wireless communication device at another end.

7. The wireless communication device according to claim 6, wherein the wireless communication device at this end includes a plurality of antennas having different characteristics, and the control unit switches among the plurality of antennas.

8. The wireless communication device according to claim 6, wherein the control unit changes the antenna characteristics by using a single antenna.

9. The wireless communication device according to claim 1, wherein the control unit changes a frequency band which the wireless communication unit of the wireless communication device at this end uses for communication, to decrease the received signal strength of each of the wireless communication device at this end and the wireless communication device at another end.

10. The wireless communication device according to claim 1, wherein the wireless communication device performs wireless communications based on Bluetooth.

* * * * *